June 11, 1957 LE ROY WOTTRING 2,795,169
SLIDE PROJECTOR APPARATUS
Filed May 18, 1954 5 Sheets-Sheet 1
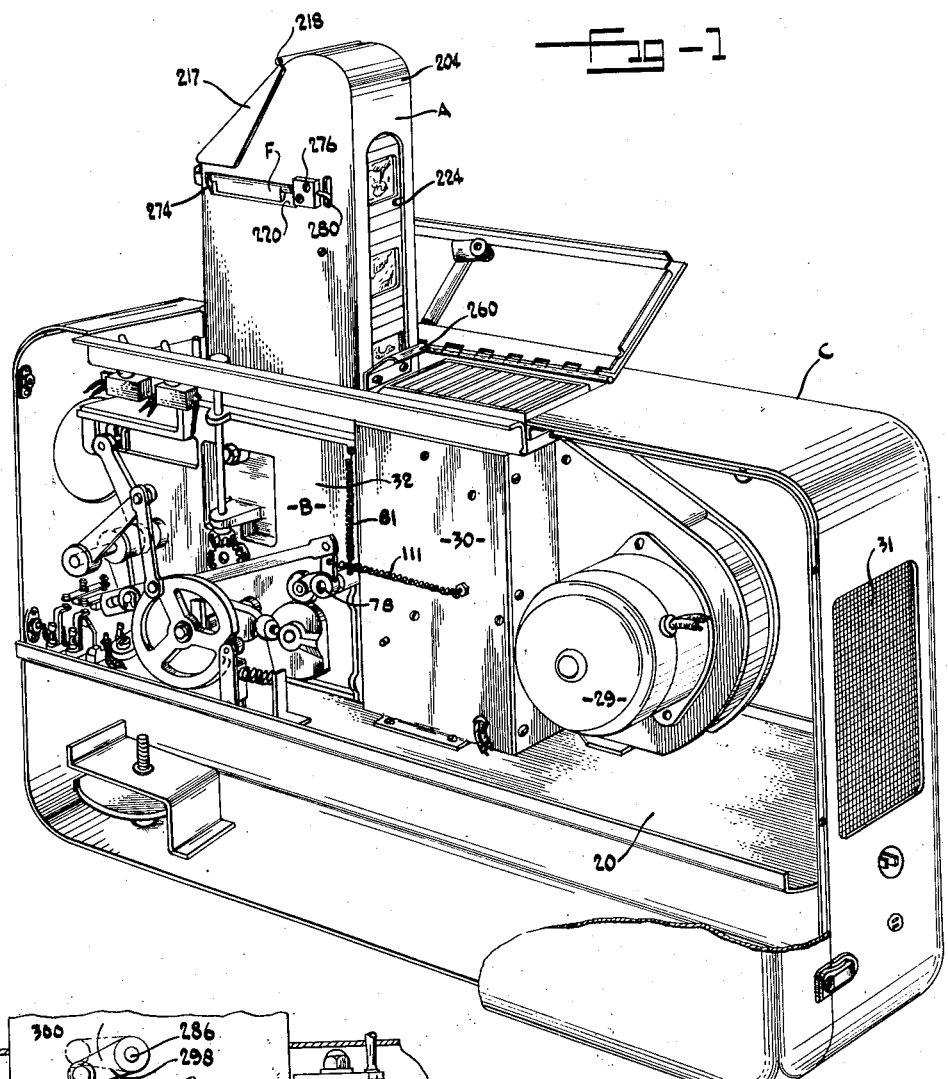
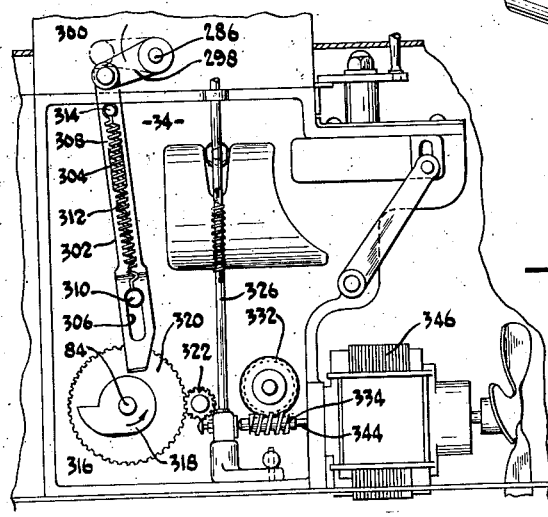
INVENTOR.
LE ROY WOTTRING
BY *Zulwider, Mattingly & Huntley*
ATTORNEYS

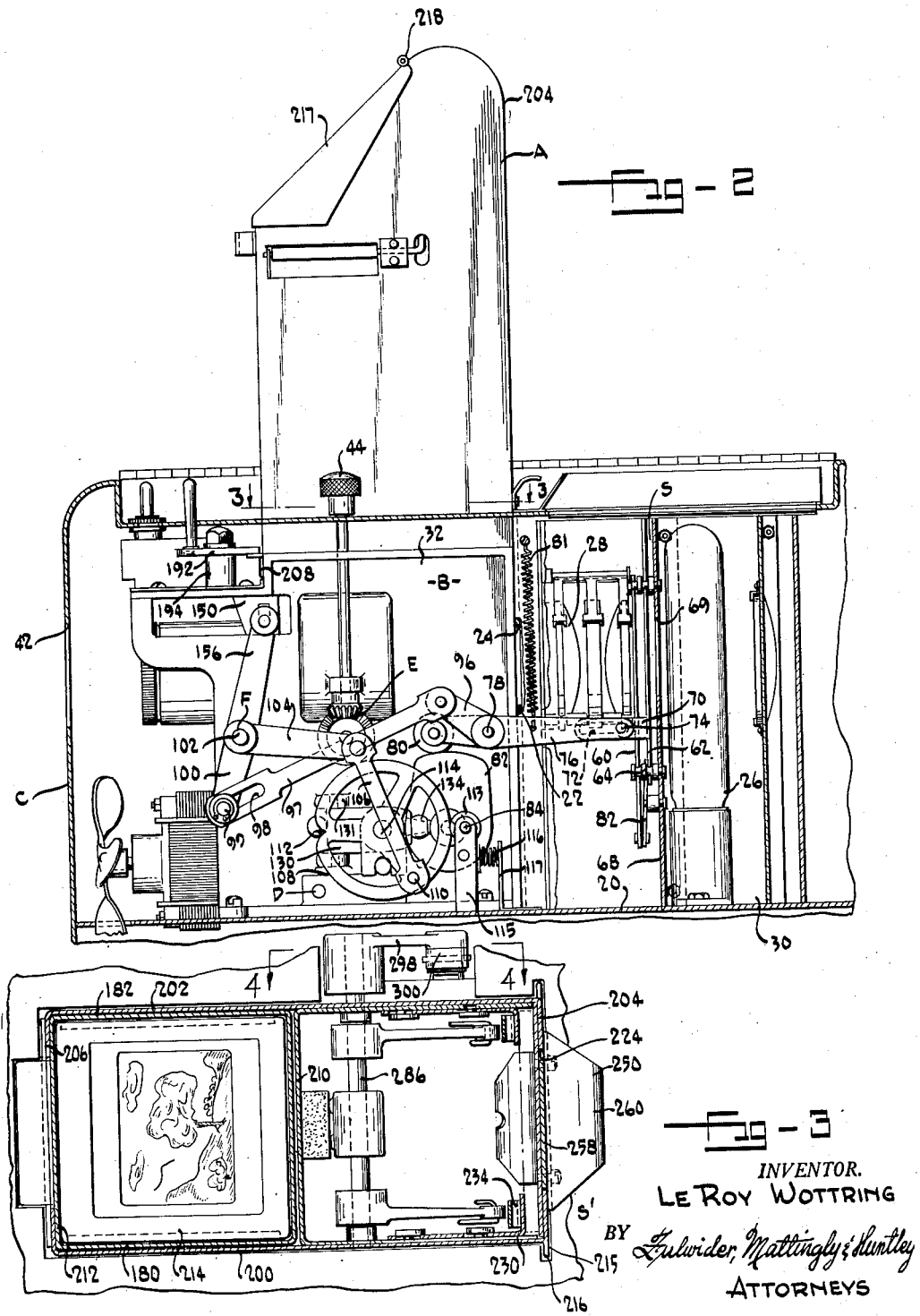

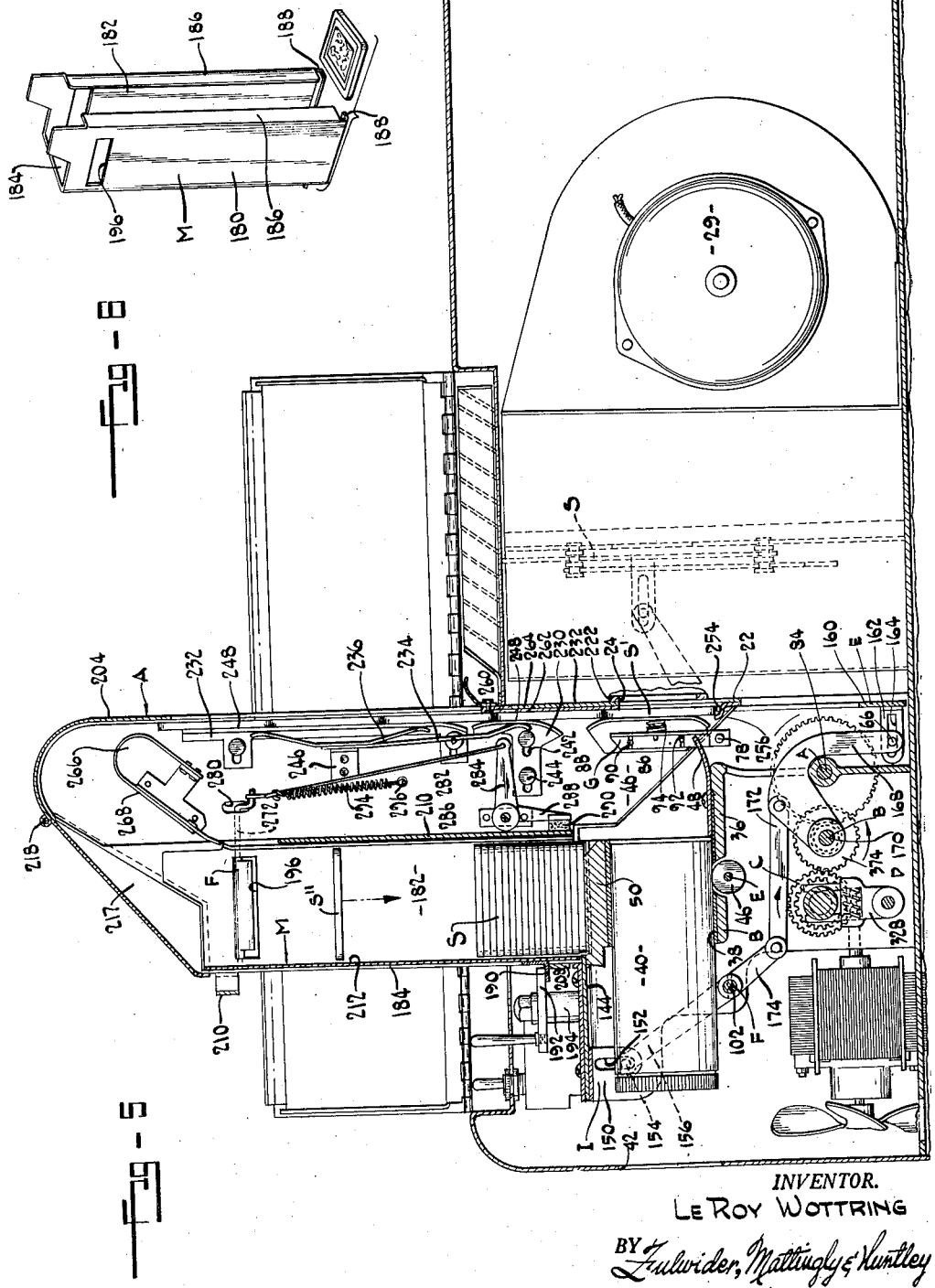

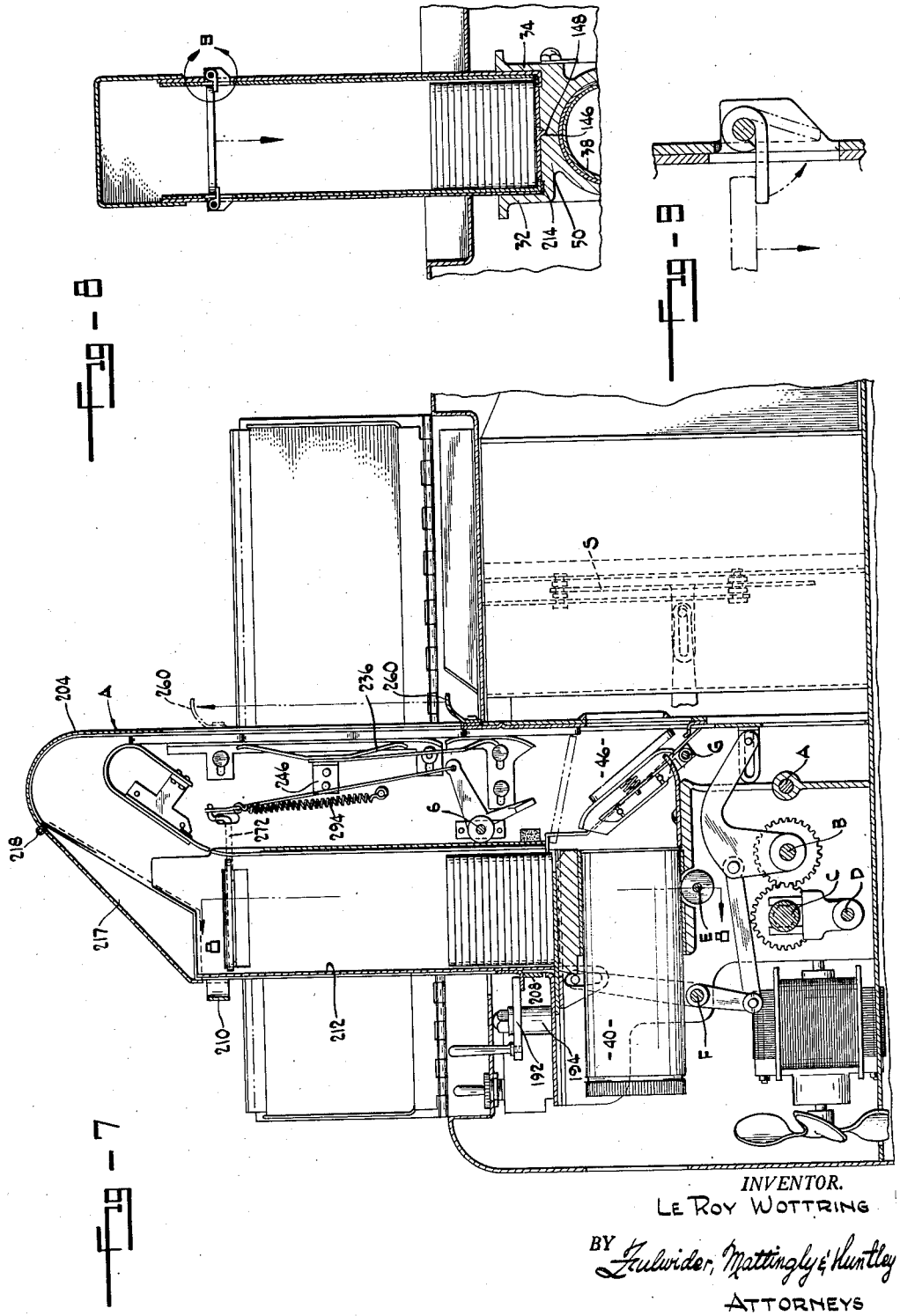

June 11, 1957  LE ROY WOTTRING  2,795,169
SLIDE PROJECTOR APPARATUS
Filed May 18, 1954  5 Sheets-Sheet 5
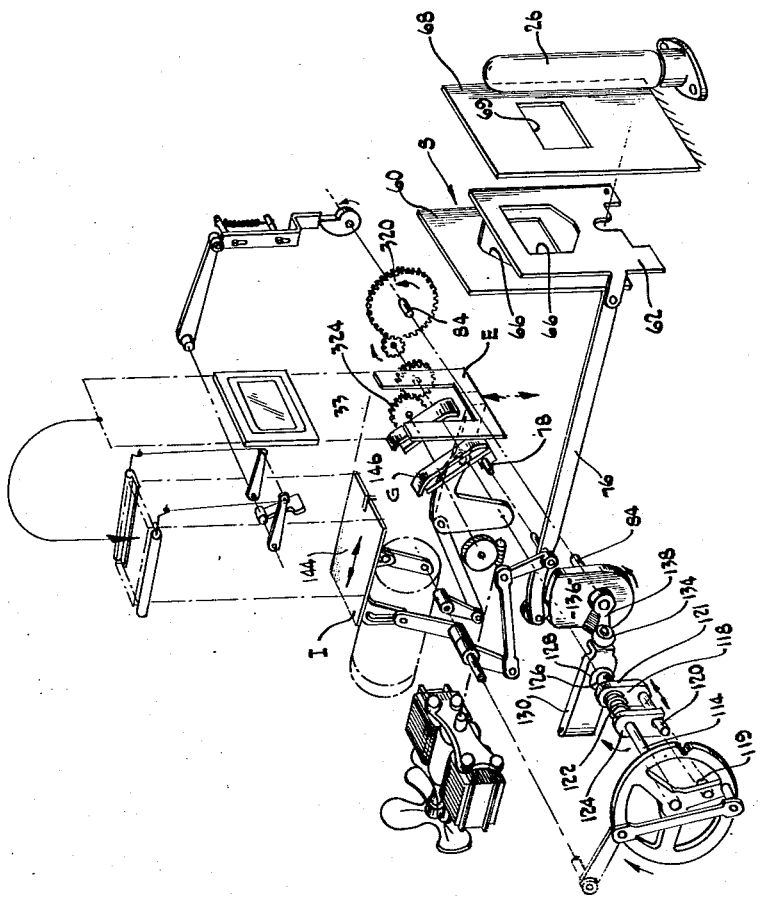
INVENTOR.
LE ROY WOTTRING
BY
ATTORNEYS

United States Patent Office 2,795,169
Patented June 11, 1957

2,795,169

SLIDE PROJECTOR APPARATUS

Le Roy Wottring, Altadena, Calif., assignor to Cadwell Corporation, Los Angeles, Calif., a corporation of California Application May 18, 1954, Serial No. 430,563

16 Claims. (Cl. 88—28)

The present invention relates generally to slide exhibiting apparatus and more particularly to a novel slide projecting apparatus adapted to automatically change a number of slides without requiring the presence of an attendant.

It is a major object of the present invention to provide a slide projector apparatus that is completely automatic in operation whereby the services of an attendant may be eliminated.

There have been heretofore proposed slide projecting apparatus adapted to automatically change a plurality of slides without requiring the presence of an attendant. Examples of such apparatus are shown in United States Letters Patent No. 2,593,007 issued April 17, 1952 to Clarence John Cadwell and Frank M. Adamson, and United States Letters Patent No. 2,671,378 issued March 9, 1954 to Ronald L. Burla. Such apparatus utilize a magazine wherein a number of slides are initially stacked. During the projection operation, the bottommost slide is first urged out of the stack into position to be exhibited. After it has been exhibited, the first slide is caused to start moving upwardly relative to the magazine. Concurrently, the second slide in the magazine is urged into the position originally occupied by the first slide whereby it may be exhibited. Thereafter, the second slide follows the path of the first slide relative to the magazine. This process is repeated until eventually the first slide topples into the top of the magazine whereby it may fall downwardly therethrough into position to be again exhibited. With such heretofore-proposed slide projecting apparatus it is necessary that the magazine be filled with slides to within a short distance from its upper end, otherwise it often occurs that the first or a subsequent slide in falling through the magazine will not remain disposed in a substantially horizontal plane. Instead it will rotate from a horizontal plane so as to land upon one of its edges. When this takes place a jamming of the slide changing mechanism usually occurs. The apparatus must then be partially dismantled before it can again be placed in operation. It is also possible that the slide and/or part of the slide changing mechanism may be damaged by such jamming.

It is an important object of the present invention to provide a slide projecting apparatus incorporating novel means for preventing the occurrence of such jamming. Such novel means eliminates the need of substantially filling the magazine with slides and permits the apparatus to utilize any desired number of slides.

A further object is to provide a slide projecting apparatus of the aforedescribed nature that may be operated with slides that vary in thickness.

Yet a further object of the invention is to provide a slide projecting apparatus having an efficient cooling system thereby permitting the use of a projection lamp of a comparatively high wattage rating.

Another object is to provide a slide projecting apparatus of the aforementioned nature that is light in weight and compact in size whereby it lends itself to ready portability.

An additional object is to provide a projecting apparatus of the aforedescribed nature having a magazine which may be readily removed from the apparatus and used for the convenient storing of slides.

A further object is to provide a slide projecting apparatus wherein the slides may be changed in rapid or relatively slow sequence so that the rate of changing thereof may be adjusted.

These and other objects and advantages of the present invention will become apparent from the following detailed description, when taken in conjunction with the appended drawings wherein:

Figure 1 is a perspective view, showing a preferred form of slide projecting apparatus embodying the present invention;

Figure 2 is a side elevational view of the major components of said apparatus;

Figure 3 is a horizontal sectional view taken on lines 3—3 of Figure 2;

Figure 4 is a vertical sectional view taken on lines 4—4 of Figure 3;

Figure 5 is a vertical sectional view showing the slide changing mechanism of said apparatus;

Figure 6 is a reduced perspective view of a slide magazine to be utilized with said apparatus;

Figure 7 is a vertical sectional view similar to Figure 5 but showing the parts of the slide changing mechanism disposed in a different position;

Figure 8 is a vertical sectional view taken on line 8—8 of Figure 7;

Figure 9 is an enlarged view of the encircled area designated 9 in Figure 8; and Figure 10 is an exploded view of the major components of said apparatus.

General arrangement

Referring to the drawings the preferred form of slide projection apparatus embodying the present invention is shown mounted within a case C whereby it may be readily carried from one location to another. The case C mounts a horizontal base plate 20 upon which is secured a lamp house, generally designated 30. The front wall 22 of the lamp house 30 is formed with an aperture 24 through which light is projected from a suitable lamp 26 by a system of condensing lenses 28. An electric motor-driven blower 29 is provided for cooling the lamp house 30 and the rear wall of the case C is formed with an air inlet 31 for this blower. The upper end of the lamp house 30 is open in order that air forced thereinto by the blower 29 may be exhausted therefrom. Interposed between the lamp house 30 and the condensing lens system 28 is a shutter mechanism S to be more fully described hereinafter.

Forwardly of the lamp house 30 there is rigidly mounted on the base plate 20 a metallic body B. This body B includes parallel upstanding side walls 32 and 34 that are bridged by a section 36, which section as indicated in Figures 5 and 8, is formed with a cylindrical cavity 38 wherein is disposed a focusing lens system 40. The latter is in alignment with the aperture 24, the condensing lens system 28 and a circular opening 42 formed in the front wall 44 of the case C. Control over the setting of the focusing lens system 40 may be effected by means of a control knob 44 that is connected by suitable gearing to a drive wheel 46 which is shown in Figure 5.

Intermediately of the focusing lens system 40 and the front wall 22 of the lamp house 30, the body B defines a slide receiving chamber 46 that is shown clearly in Figure 5. The lower end of this slide receiving chamber 46 is defined by a rearward continuation of the body section 36 and a flat plate 48 which is rigidly secured thereon. This plate has an upwardly and rearwardly curved rear portion and serves to direct a cooling blast of air from the blower 29 toward the aperture 24. A slide gate G, to be more fully described hereinafter, is disposed within the slide receiving chamber 46. The upper wall 50 of the body section 36 mounts an injector I to be more fully described hereinafter for urging the slides S into the slide receiving chamber 46 in a position to be exhibited. An ejector E also described more fully hereinafter is movable upwardly through the rear of the slide receiving chamber so as to lift the slides S out of this chamber after they have been exhibited. A stack of the slides S is shown disposed within a magazine M that is removably positioned within a magazine supporting member A carried by the upper portion of the body B. The magazine M and its supporting member A are fully described hereinafter.

The shutter mechanism S

The shutter mechanism S includes a pair of flat plates 60 and 62 that are slidably mounted within guides 64 for relative vertical reciprocation. The intermediate portion of each plate 60 and 62 is formed with complementary openings 66, as indicated in Figure 10. The guides 64 are rigidly secured to the front of a fixed vertically extending plate 68 that is rigidly mounted forwardly of the lamp 26. This fixed plate 68 is formed with a rectangular opening 69 that is in alignment with the condensing lens system 28 and the aperture 24.

As shown in Figure 2, the rear plate 62 rigidly mounts a forwardly extending bracket 70 that is formed with a horizontal slot 72. This slot 72 slidably receives a pin 74 which is affixed to the rear of a horizontally extending rock arm 76. The intermediate portion of this rock arm 76 is journaled upon a horizontally extending shaft 78 having its ends rotatably supported by the side walls 32 and 34 of the body B. The front end of the rock arm 76 rotatably mounts a cam follower wheel 80. The rear end of the rock arm 76 is constantly biased upwardly by a helical tension spring 81 having its upper end secured to one side of the lamp house 30. The cam follower wheel 80 is engaged with the periphery of a cam 82, which cam is keyed to a second horizontal shaft 84 that is carried between the side walls 32 and 34 of the body B. This shaft 84 may be termed a timing shaft. The outline of the cam 82 is of such a configuration that rotation of the cam will cause the cam follower wheel 80, and hence the front of the rock arm 76, to undergo vertical reciprocation relative to the body B. Concurrently with such vertical movement the rear end of the rock arm 76 and hence the rear plate 62 will undergo vertical reciprocation. The front and rear plate 60 and 62 and the fixed plate 68 are interconnected by linkages 82 in such a manner that upon movement of the rear plate 62 upwardly the front plate 60 will be moved downwardly relative thereto. In this manner the plate openings will alternately admit and then block out light given off by the lamp 26 with respect to the aperture 24. The tension spring 81 normally maintains the plate openings 66 in alignment whereby light is normally permitted to pass through aperture 24. The cam 82 is driven in a manner to be set forth hereinafter.

The slide gate G

The slide gate G is shown in detail in Figures 3, 5 and 10 and it includes a pair of spaced parallel arms 86 that are keyed at their lower ends to the horizontal shaft 78 mentioned above in the description of the shutter mechanism S. Each of these arms 86 mounts a wedging shoe 88 by means of pins 90 carried by the latter, these pins being slidably received within slots 92 formed in the arms. A helical coil spring 94 is interposed between the mid-portion of each arm and its respective wedging shoe for constantly biasing the shoe rearwardly relative to the arm. As indicated in Figure 5, the wedging shoes 88 are disposed at either side of the aperture 24 whereby they may resiliently retain a slide S' in front of this aperture while the slide is being exhibited. It should be noted that the resilient mounting of the wedging shoes 88 permits them to accommodate slides which vary in thickness.

The slide gate G is adapted to be rocked between its position of Figures 5 and 7 in timed relationship to the movement of the slides into and out of the slide receiving chamber 46. As indicated in Figures 1, 2 and 10, the shaft 78 is keyed to the lower end of a crank arm 96. The upper end of this crank arm 96 is in turn pivotally connected to the rear end of a link 97 having its front end formed with a longitudinally extending slot 98. This slot 98 slidably receives a pin 99 that is mounted by the lower end of a second crank arm 100. The second crank arm 100 is keyed to a horizontal shaft 102 which is rotatably journaled by the side walls 32 and 34 of the body B. The outer end of the shaft 102 is keyed to another crank arm 104 which has its opposite end pivotally connected to a cross-link 106. The opposite end of the latter link 106 is in turn pivotally attached to the rim of an intermittently rotatable wheel 108 by a pin 110. A helical tension spring 111 is interposed between the intermediate portion of the crank arm 96 and one side of the lamp house 30. With this arrangement, the latter crank arm 96, and hence the slide gate G, is normally disposed in its vertical position of Figure 5 and is constantly biased rearwardly toward the aperture 24 by the spring 111. Upon each rotation of the wheel 108, however, the crank arm 100 is caused to pivot forwardly and then rearwardly several degrees. Upon forward pivotal movement of this crank arm 100, the link 97 will pull the crank arm 96 and the slide gate G forwardly to their position of Figures 7 and 10. Thereafter, as the crank arm 100 returns rearwardly, the spring 111 will retract the crank arm 96 and the slide gate to their normal position. It should be noted that inasmuch as the upper and lower ends of the wedging shoes are curved forwardly, the danger that a slide might slip forwardly thereof is substantially eliminated.

The rim of the wheel 108 is formed with a notch 112 that is adapted to receive a detent 113. This detent 113 serves to normally secure the wheel against rotation about a horizontal shaft 114 upon which the wheel is journaled. The shaft 114 is journaled between the side walls 32 and 34 of the body B. The detent 113 is carried at the upper end of a vertically extending arm 115 that is pivotally secured at its lower end to the base plate 20 for rocking movement toward and away from the wheel 108. The arm 115 is constantly biased forwardly toward the wheel 108 by a helical compression spring 116. This spring 116 is secured at its rear end to a bracket 117 carried by the base plate 20.

Intermittent rotation of the wheel 108 is effected by means of a clutch mechanism, generally designated 118, and shown most clearly in Figure 10. This clutch mechanism 118 includes an inwardly extending driven pin 119 integrally formed on the wheel 108 and adapted to be intermittently engaged by a drive pin 120 carried at the outer end of a crank arm 121. The crank arm 121 is keyed for concurrent rotation with the shaft 114 but is free to move axially along this shaft. The crank arm 121 is normally biased inwardly away from the wheel 108 by a helical compression spring 122 which encircles the shaft 114. A guide fork 124 for the drive pin 120 is rigidly secured to the shaft 114. The radially inner end of the crank arm 121 is formed with a boss 126 and a washer 128 is carried by the shaft 114 adjacent thereto. A trip finger 130 abuts the opposite side of the washer 128, which trip finger is pivotally connected at its front end to the base side wall 32 between bifurcations 131 formed thereon. The rear end of the trip finger 130 rotatably mounts a cam follower disc 134 which rides against the face 136 of the cam 82.

As indicated in Figure 10, a tripping projection 138 is formed upon the face 136 of the cam 82. This tripping projection 138 moves in a rotary path which intersects the cam follower disc 134 during each revolution of the cam so that when the cam rotates the free end of the trip finger 130 will be moved outwardly against the effort of the spring 122 to cause the drive pin 120 to engage the driven pin 117 and move the wheel 108 in unison with the shaft 114. The width of the tripping projection 138 is such that the pins 119 and 120 will remain engaged long enough for the wheel 108 to complete one revolution. The detent 113 will then drop into the notch 112 so as to restrain the wheel 108 against further motion. It should be particularly noted that the detent 113 by restraining the wheel 108 against rotation past a certain point safeguards the slide changing mechanism against damage should a jam develop during the operation thereof. This is true because in stopping the wheel 108 the inertia built up in the various elements of the slide changing mechanism is immediately dissipated once the detent 113 drops in the notch 112. A jam could occur should a bent slide be inadvertently introduced into the magazine M.

The injector I

The injector I is disclosed in Figures 5, 7, 8 and 10 and it includes a flat plate 144 which reciprocates horizontally along the upper wall 50 of the body B so as to intermittently urge the lowermost slide within the magazine M rearwardly into the slide receiving chamber 46. The underside of the injector plate 144 is formed with a depending tongue 146 which is slidably disposed within a guide groove 148 formed in the upper wall 50, as shown in Figure 8. Forwardly of the tongue 146 a pair of brackets 150 depends from the sides of the injector plate 144. Each of these brackets is formed with a vertically extending slot 152. The latter slots 152 slidably receive a pin 154 formed upon the upper end of a pair of rock arms 156. The lower pin ends of these rock arms 156 are keyed to the horizontal shaft 102 described hereinbefore in connection with the detailed description of the shutter mechanism S. With this arrangement, rocking movement of the shaft 102 under the influence of the wheel 108 will cause the rock arms 156 to pivot between their positions of Figures 5 and 7 to thereby move the injector plate 144 from its normal forwardly disposed position of Figure 5 to its rearwardly disposed position of Figure 7.

The ejector E

The ejector E is disclosed in Figures 5, 7 and 10 and it includes a generally U-shaped pusher element 160 which is adapted to be vertically reciprocated between its normal lowered position of Figure 5 to its raised position of Figure 7. The lower end of this pusher element 160 centrally mounts a forwardly extending bracket 162 that is formed with a horizontally extending slot 164. This slot 164 slidably receives a pin 166 which is carried by the rear end of a crank element 168. The opposite end of this crank element 168 is journaled by a horizontally extending shaft 170 that is supported at its ends by the body side walls 32 and 34. The intermediate portion of the crank element 168 is pivotally connected to the rear end of a link 172. The front end of the link 172 is connected in turn to the lower end of a crank arm 174. The upper end of the crank arm 174 is keyed to the midportion of the shaft 102 that has been described hereinbefore in the detailed description of the shutter mechanism S. With this arrangement, rocking movement of the shaft 102 under the influence of the wheel 108, will cause the crank element 168 to pivot between its positions of Figures 5 and 7 to thereby raise the pusher element 160 from its normal position of Figure 7 to its elevated position of Figure 5.

The magazine M

The magazine M is disclosed in Figures 5, 6 and 8 and preferably it will be formed from a single metallic blank so as to define a pair of upstanding side walls 180 and 182 connected at their front ends by a front wall 184. The rear ends of each side wall are turned inwardly so as to define a pair of vertical flanges 186. The lower end of each side wall is likewise turned inwardly so as to define horizontal flanges 188. A vertical space exists between the lower ends of the front wall 184 and the upper surfaces of the flanges 188, and between the lower ends of the flanges 186 and upper surfaces of the flanges 188 so as to provide clearance for the plate 144 of the injector I and the slides urged rearwardly thereby during operation of the apparatus. A forwardly extending bracket 190 is rigidly secured to the lower portion of the front wall 184 and the upper surface thereof is adapted to be releasably engaged by a hold-down latch 192 that is pivotally mounted on a post 194 secured to the top of the body B. The upper portion of the side walls 180 and 182 are formed with a pair of aligned rectangular openings 196 for a purpose to be set forth hereinafter. The cross-sectional area of the magazine M is somewhat greater than that of the slides.

The magazine supporting member A

The magazine supporting member A is generally rectangular in horizontal cross-section and includes a pair of upstanding side walls 200 and 202 that are rigidly interconnected by a rear wall 204. A pair of inwardly extending flanges 206 extend from the front end of each side wall, which flanges are rigidly interconnected by a lower cross-bar 208 and an upper cross-bar 210. The intermediate portion of the side walls 200 and 202 are rigidly interconnected by a vertical wall 210 whereby a magazine receiving chamber 212 is defined forwardly of said wall. As indicated in Figures 5 and 8, a pair of inwardly extending horizontal flanges 214 are formed at the lower end of the sides of this chamber 212 and the underside of these flanges rest upon the top of the upper wall 50 of the body B. As indicated in Figure 3, the lower portion of the rear wall 204 is formed with lateral extensions 215 adapted to be inserted within complementary vertical grooves 216 defined between the rear end of the body side walls 32 and 34 and the front wall 22 of the lamp house 30. A vertical clearance exists between the upper surfaces of the flanges 214 and the lower end of the flanges 206 so as to provide clearance for the plate 144 of the injector I and the slides urged rearwardly thereby during operation of the apparatus. The upper end of the magazine receiving chamber 212 is normally closed by a cover 217 which is pivotally connected at 218 to the upper portion of the magazine supporting member A. A pair of rectangular openings 220 are formed in the side walls 200 and 202, which openings 220 are aligned with the openings 196 of the magazine M when the latter is positioned within the magazine receiving chamber 212.

As shown in Figure 5, the lower portion of the rear wall 204 is formed with an opening 222. This opening 222 corresponds generally to the size and configuration of the aperture 24 formed in the front wall 22 of the lamp house 30. When the magazine supporting member A is arranged in operative position, the opening 222 is aligned with the aperture 24. As indicated in Figures 1 and 3, a vertically elongated opening 224 is also formed in the rear wall 204 above the lower opening 222.

As mentioned previously hereinbefore, after each slide has been exhibited it is raised from a position in front of the aperture 24 by the ejector E. The slide in being raised moves along the front of the rear wall 204 of the magazine supporting member A. As indicated in Figures 5 and 7, succeeding slides raised by the ejector E will likewise move upwardly along the front of the rear wall 204. It will thus be apparent that some means must be provided for restraining downward retrograde movement of these slides under the influence of gravity. Referring now to Figures 3 and 5, such means will preferably comprise a pair of lower anchor shoes 230 and a pair of upper anchor shoes 232, which shoes are respectively constantly biased rearwardly toward the rear wall 204 by a first pair of spring fingers 234 and a second pair of spring fingers 236. The lower pair of anchor shoes 230 are formed with horizontal slots 238 that slidably receive pins 240 secured to the side walls 200 and 202. Similarly, the upper pair of anchor shoes 232 are formed with horizontal slots 242 which slidably receive pins 244 secured to the side walls 200 and 202. The pairs of spring fingers 234 and 236 are affixed to brackets 246, each secured to one of the side walls. With this arrangement, the rearwardly facing surfaces 248 of the anchor shoes 230 and 232 will frictionally engage the front surfaces of the sides of the slides so as to prevent their downward movement. The rearward force exerted by the spring fingers 234 and 236 is not of such a magnitude, however, as to prevent upward movement of the slides under the influence of the pusher element 160 of the ejector E. It should be noted that the resilient mounting of the anchor shoes 230 and 232 permits them to accommodate slides which vary in thickness. It should be further noted that the use of a plurality of anchor shoes rather than a single long shoe insures that the lowermost slide will always be positively anchored even though slides which vary in thickness are utilized. This would not be the case if a single shoe was employed and a slide of lesser thickness followed one of a greater thickness.

In order that the slides S disposed between the anchor shoes 230 and 232 and the rear wall 204 may at any time be manually urged out of the rear portion of the magazine supporting member A, there is provided a slide removing member 250. This member 250 includes a vertical plate 252 which normally extends from the lower end of the rear wall 204 to the lower edge of the upper opening 224. The rear surface of this plate 252 slidably abuts the front surface of the rear wall 204. An opening 254 corresponding in size and configuration to the opening 222 formed in the rear plate 204 is formed in the lower portion of the vertical plate 252 and is normally aligned with the opening 222. A forwardly extending lip 256 projects from the lower edge of the opening 254. As indicated in Figure 3, a horizontal strip 258 of slightly less width than the opening 224 is interposed between the upper end of the plate 252 and the front end of a rearwardly extending handle 260. The sides of the handle 260 extend beyond the side edges of the opening 224. A rearwardly extending dimple 262 is formed at the upper midportion of the plate 252 for insertion within a complementary hole 264 formed in the rear wall 204. The dimple 262 is normally disposed within the hole 264 so as to releasably retain the slide receiving member 250 locked to the rear wall 204 of the magazine supporting member A. When it is desired to manually clear the rear portion of the magazine supporting member A of slides, the handle 260 is lifted upwardly. The lip 256 will then engage the lower edge of the lowermost slide and cause this slide as well as the slides disposed thereabove to move upwardly within the rear portion of the magazine until they topple forwardly into the upper end of the magazine M.

During the continued automatic operation of the projector apparatus embodying the present invention, the slides S will each be moved from a stacked position within the magazine M to a vertical position in front of the aperture 24, and thereafter they will travel up the rear portion of the magazine supporting member A. As the slides are moved up the rear portion of this member, the uppermost slide will ultimately be returned to the magazine M. To this end a guide member 266 having a downwardly and forwardly inclined front surface 268 is secured to the upper end of the vertical wall 210. The guide 266 serves to direct the uppermost slide back into the upper end of the magazine M. This slide will then fall downwardly through the magazine until it rests upon the top slide remaining therein as indicated in Figure 5 wherein the falling slide is designated S".

In order to insure that each falling slide will remain disposed in a substantially horizontal plane during its downward movement, the preferred embodiment of the present invention utilizes a pair of stabilizing fingers F that are disposed in alignment with the openings 196 and 220 of the magazine M and the magazine supporting member A, respectively. These stabilizing fingers F are rigidly affixed to a pair of horizontal rods 272. The rods 272 have their front ends rotatably carried within a bored bracket 274 extending from the outer surfaces of the side walls 200 and 202 and are journaled at their intermediate portions by bored plates 276 secured to the outer surfaces of the side walls. The rear portions of the rods 272 extend inwardly into the interior of the magazine supporting member A through slots 280 formed in the side walls thereof. The rearmost extremities of the rods 272 are pivotally connected to the upper ends of a pair of downwardly and rearwardly extending links 282. The lower ends of the latter are in turn pivotally connected to the free ends of a pair of crank arms 284 having their opposite ends keyed to a horizontal shaft 286. The horizontal shaft 286 is journaled by the lower intermediate portion of magazine supporting member A. The mid-portion of the shaft 286 is keyed to a downwardly extending stop 288, the free end of this stop is adapted to abut a pad of resilient material 290 that is affixed to the lower end mid-portion of the vertical wall 210. A pair of tension springs 294 interconnect the upper portions of the links 282 and a horizontal rod 296, which bridges the side walls 200 and 202 downwardly of the rods 272. Outwardly of the side walls 202 the shaft 286 is keyed to a crank arm 298, as shown in Figures 3 and 4. The free end of this crank arm 298 rotatably mounts a roller 300.

Referring now to Figures 4 and 10, the roller 300 abuts the upper end of a generally vertically extending push rod 302. The push rod 302 is formed with slots 304 and 306 that slidably receive pins 308 and 310, respectively, mounted by the side wall 34 of the body B. A tension spring 312 is interposed between the lower pin 310 and a stud 314 mounted by the upper portion of the push rod 302. Thus, the push rod 302 is continually biased downwardly to its position of Figure 4. The push rod is adapted to be raised from its normal position by the engagement of its lower portion with the tripping surface 316 of a cam wheel 318 that is keyed to the timing shaft 84 described previously herein.

With this arrangement, the stabilizing fingers F will normally be maintained in their dotted line position of Figure 9 outside the openings 196 and 220 because of the downward force exerted by the springs 284 upon the wires 272 and hence the inner ends of rods 262. The crank arm 298 is meanwhile biased towards its dotted line position of Figure 4 by the spring 284. Likewise, the push rod 302 is retained in its solid line position of this figure by the spring 312. When the cam wheel 318 is rotated its tripping surface 316 will engage the lower portion of the push rod 302 and the latter will be forced upwardly so as to urge the crank arm 298 to its dotted line position of Figure 4. The free ends of the crank arms 284 will then raise the links 282 and thereby cause the rods 272 to pivot the stabilizing fingers F inwardly through the openings 196 and 220 to their solid line position of Figure 9. This inward movement of the stabilizer fingers F is so timed that it will take place just as a slide drops into the top of the magazine M from the rear portion of the magazine supporting member A. Hence, the fall of this slide will be momentarily arrested as it is forced to assume a substantially horizontal position relative to the magazine. The slide will remain in such position as it drops through the magazine onto the top slide in the stack S. It should be particularly observed that the stabilizing fingers F and their actuating mechanism is of comparatively lightweight construction. This permits these fingers to snap downwardly away from the underside of each slide. Accordingly, neither side of the slide will have a chance to follow one of the fingers and in this manner receive a tilting action. Thus, the slide will always fall in a substantially horizontal plane.

*Operation*

It will be apparent that the shutter mechanism S, injector I, ejector E and the stabilizing fingers F are operated in timed sequence during the automatic operation of the apparatus. This is true because the aforementioned units are each actuated by virtue of their operative connection with the timing shaft 84. The timing shaft 84 is keyed to a gear 320 exteriorly of body side wall 34, as indicated in Figure 4. The gear 320 is meshed with a pinion 322 that is keyed to the shaft 114. The pinion 322 is adapted to be driven at one of two speeds by means of a transmission 324. Control over the output speed of the transmission is effected through a control rod 326 that is connected at its lower end to a shifting fork 328. The input shaft 330 of the transmission 324 is keyed to a pinion 332 which is meshed with a worm gear 334. The latter is in turn keyed to the shaft 344 of a suitable electric motor 346.

Before placing the apparatus in operation a stack of slides S will be placed in the magazine M and the latter will be telescopically inserted within the magazine receiving chamber 212 of the magazine supporting member A. The latter member will then be lowered within the opening 346 formed in the top of the case C between the upper portion of the side walls 32 and 34 of the body B. A pivotally mounted cover 348 is provided for the opening 346. The hold-down latch 192 will then be rotated so as to engage the upper surface of the bracket 190 of the magazine M, the underside of this bracket 190 bearing against the upper edge of the lower cross-bar 208 of the magazine supporting member A, as indicated in Figures 4 and 5. The magazine and its supporting member will thus both be locked in operative position. At this time the injector I, the ejector E and the shutter mechanism S will be disposed in their positions of Figure 5 and the stabilizing fingers F will be disposed in their dotted line position of Figure 9.

Next, with the lamp 26 illuminated the motor 346 will be energized and the timing shaft 84 will commence rotation. Rotation of this shaft 84 causes the cam 82 to undergo concurrent rotation until the shutter plates 60 and 62 are actuated to block off light from the lamp 26 with respect to the aperture 24. Before such blocking takes place the slide S' positioned before the aperture 24 will have been exhibited. With the light from the lamp blocked off by the shutter plates 60 and 62 the tripping projection 138 of the cam 82 will engage the free end of the trip finger 130 so as to effect a single revolution of the wheel 108 in the manner set forth hereinbefore. During the revolution of the wheel 108 the plate 144 of the injector I will move rearwardly, the slide gate G will rock forwardly and the pusher element 160 of the ejector E will move upwardly, all such movements occurring simultaneously in accordance with the foregoing description. Accordingly, as indicated in Figure 7, the lowermost slide in the stack S will be urged rearwardly out of the magazine M while at the same time the slide gate G will rock forwardly so as to catch this slide and position it vertically before the aperture 24. In the meantime the pusher element 160 of the ejector E will raise the slide S' clear of the aperture 24 into the rear portion of the magazine supporting member A. The slide S' will be releasably retained in this position by virtue of its engagement with the lower pair of anchor shoes 230.

After a sufficient number of slides have been exhibited that they will start returning through the rear of the magazine support member A into the magazine M, the stabilizer fingers F will act to align each slide in a substantially horizontal plane before it commences its fall through the magazine. The movement of the stabilizer fingers F is effected by engagement of the tripping surface 316 of the cam wheel 318 with the push rod 302 in the manner described hereinbefore.

The various cycles of operation are continually repeated so long as the electric motor 246 remains energized. Control over the speed at which the changes are made may be effected by the setting of the transmission 324. In this way automatic exhibition of the slides may be accomplished and the speed at which the slides are exhibited may be varied to suit the desires of the user. It is also possible to provide for manual operation of the apparatus by inserting in the electrical circuit of the motor 246 a manually actuated switch (not shown) and a second switch (not shown) that is actuated by operative connection to one of the elements of the slide changing mechanism so as to break the connection made by the first switch after a single slide changing operation. The manually actuated switch may then be operated to again energize the circuit for another cycle.

It will be apparent from the foregoing disclosure that there has been provided an automatic slide projecting apparatus which does not require a fixed number of slides, but instead may utilize a desired number thereof without jamming. This apparatus may also be light in weight and of small overall dimensions as compared with existing devices of this nature. If made portable in nature, it is readily assembled for operation and when once set in motion it will automatically continue in operation without requiring the presence of an attendant. Although the apparatus disclosed hereinbefore is presently considered to be the preferred embodiment of the invention, it will be understood by those skilled in the art that various changes and modifications may be made thereto without departing from the spirit of the invention or the scope of the following claims.

I claim:

1. Slide projector apparatus comprising: a frame formed with an aperture before which a slide may be disposed so as to be exhibited; magazine means carried by said frame and having a chamber holding a stack of slides to be exhibited, said magazine means including a pair of vertically extending confronting walls formed at their upper portion with a pair of horizontally extending aligned openings; injector means on said frame for urging the bottommost slide in said stack into a position to be exhibited in front of said aperture; ejector means on said frame for urging a slide upwardly away from said aperture after it has been exhibited; means on said magazine means for receiving the slides from said ejector and preventing their retrograde downward movement, the slides from said ejector ultimately dropping into the upper end of said chamber; a pair of flat, horizontally extending stabilizing fingers pivotally mounted by the confronting walls of said magazine means, the free end of each of said fingers being rotatable upwardly about a horizontal axis through one of said openings into the confines of said chamber; spring means normally biasing the free ends of said fingers to a position outside of the confines of said chamber; and, means interposed between said fingers and said frame for pivoting said fingers into the confines of said chamber in timed relationship with the movement of said bottommost slide into a position to be exhibited whereby each slide dropping into the upper end of said chamber will be caused to assume a substantially horizontal position before resuming its fall therethrough.

2. Slide projector apparatus comprising: a frame formed with an aperture before which a slide may be disposed so as to be exhibited; magazine means carried by said frame and having a chamber holding a stack of slides to be exhibited, said magazine means including a pair of vertically extending confronting walls formed at their upper portion with a pair of horizontally extending aligned opening; injector means on said frame for urging the bottommost slide in said stack into a position to be exhibited in front of said aperture; ejector means on said frame for urging a slide upwardly away from said aperture after it has been exhibited; means on said magazine means for receiving the slides from said ejector and preventing their retrograde downward movement, the slides from said ejector ultimately dropping into the upper end of said chamber; a pair of flat, horizontally extending stabilizing fingers; a pair of horizontally extending rods, each of said rods being rigidly affixed to one edge of one of said stabilizing fingers; means pivotally connecting said rods to the confronting walls of said magazine whereby the free ends of said stabilizing fingers may rotate upwardly about a horizontal axis through said openings into the confines of said chamber; spring means normally biasing the free end of said fingers to a position outside of the confines of said chamber; and, linkage means interposed between said horizontal rods and said frame for causing said rods to pivot said fingers into the confines of said chamber in timed relationship with the movement of the bottommost slide into a position to be exhibited whereby each slide dropping into the upper end of said chamber will be caused to assume a substantially horizontal position before resuming its fall therethrough.

3. Slide projector apparatus as set forth in claim 2 where said linkage means includes a horizontal shaft mounted by the lower portion of said magazine means normal to the rotational axis of said horizontal rods, a pair of crank arms keyed to said horizontal shaft, a pair of vertically extending links each connecting one of said horizontal rods with the free end of one of said crank arms whereby rotation of said horizontal shaft will effect concurrent rotation of said horizontal rods, and a stop keyed to said horizontal shaft, the free end of said stop normally abutting said magazine means.

4. Slide projector apparatus as set forth in claim 3 where said frame supports a timing shaft which is operatively connected to said injector and ejector means, said frame further supports a downwardly biased, vertically extending push rod having its lower end disposed in the path of a cam wheel keyed to said timing shaft, and said horizontal shaft is keyed to a crank arm element having its free end in engagement with the upper end of said push rod.

5. Slide projector apparatus comprising: a frame formed with an aperture before which a slide may be disposed so as to be exhibited; a magazine supporting member carried by said frame and having a pair of vertically extending confronting walls; a magazine that is removably telescopically positionable within said magazine supporting member, said magazine having a pair of vertically extending confronting walls and being formed with a slide receiving chamber for holding a stack of slides; a pair of horizontally extending openings formed in the confronting walls of each of said magazine supporting member and said magazine, said openings being horizontally aligned when said magazine is disposed within said magazine supporting member; injector means on said frame for urging the bottommost slide in said stack into a position to be exhibited in front of said aperture; ejector means on said frame for urging a slide upwardly away from said aperture after it has been exhibited; means on said magazine supporting member for receiving the slides from said ejector and preventing their retrograde downward movement, the slides from said ejector ultimately dropping into the upper end of said chamber; a pair of flat, horizontally extending stabilizing fingers pivotally mounted by the confronting walls of said magazine supporting member, the free end of each of said fingers being rotatable upwardly about a horizontal axis through said openings into the confines of said chamber; spring means normally biasing the free ends of said fingers to a position outside of the confines of said chamber; and, means interposed between said fingers and said frame for pivoting said fingers into the confines of said chamber in timed relationship with the movement of said bottommost slide into a position to be exhibited whereby each slide dropping into the upper end of said chamber will be caused to assume a substantially horizontal position before resuming its fall therethrough.

6. Slide projector apparatus comprising: a frame formed with an aperture before which a slide may be disposed so as to be exhibited; a magazine supporting member carried by said frame and having a pair of vertically extending confronting walls; a magazine that is removably telescopically positionable within said magazine supporting member, said magazine having a pair of vertically extending confronting walls and being formed with a slide receiving chamber for holding a stack of slides; a pair of horizontally extending openings formed in the confronting walls of each of said magazine supporting member and said magazine, said openings being horizontally aligned when said magazine is disposed within said magazine supporting member; injector means on said frame for urging the bottommost slide in said stack into a position to be exhibited in front of said aperture; ejector means on said frame for urging a slide upwardly away from said aperture after it has been exhibited; means on said magazine supporting member for receiving the slides from said ejector and preventing their retrograde downward movement, the slides from said ejector ultimately dropping into the upper end of said chamber; a pair of flat, horizontally extending stabilizing fingers; a pair of horizontally extending rods, each of said rods being rigidly affixed to one edge of one of said stabilizing fingers; means pivotally connecting said rods to the confronting walls of said magazine supporting member whereby the free ends of said stabilizing fingers may rotate upwardly about a horizontal axis through said openings into the confines of said chamber; spring means normally biasing the free end of said fingers to a position outside the confines of said chamber; and, linkage means interposed between said horizontal rods and said frame for causing said rods to pivot said fingers into the confines of said chamber in timed relationship with the movement of the bottommost slide into a position to be exhibited whereby each slide dropping into the upper end of said chamber will be caused to assume a substantially horizontal position before resuming its fall therethrough.

7. Slide projector apparatus as set forth in claim 6 where said linkage means includes a horizontal shaft mounted by the lower portion of said magazine supporting member normal to the rotational axis of said horizontal rods, a pair of crank arms keyed to said horizontal shaft, a pair of vertically extending links each connecting one of said horizontal rods with the free end of one of said crank arms whereby rotation of said horizontal shaft will effect concurrent rotation of said horizontal rods, and a stop keyed to said horizontal shaft, the free end of said stop normally abutting said magazine supporting member.

8. Slide projector apparatus as set forth in claim 7 where said frame supports a timing shaft which is operatively connected to said injector and ejector means, said frame further supports a downwardly biased vertically extending push rod having its lower end disposed in the path of a cam wheel keyed to said timing shaft, and said horizontal shaft is keyed to a crank arm element having its free end in removable engagement with the upper end of said push rod.

9. Slide projector apparatus comprising: a frame formed with an aperture before which a slide may be disposed so as to be exhibited; a magazine supporting member carried by said frame and having a pair of vertically extending confronting walls; a magazine that is removably telescopically positionable within said magazine supporting member, said magazine having a pair of vertically extending confronting walls and being formed with a slide receiving chamber for holding a stack of slides; a pair of horizontally extending openings formed in the confronting walls of each of said magazine supporting member and said magazine, said openings being horizontally aligned when said magazine is disposed within said magazine supporting member; means on said frame for moving the bottommost slide from said stack into a position to be exhibited in front of said aperture and thence upwardly along the front surface of the rear wall of said magazine supporting member including an injector plate movable horizontally below said stack, a slide gate mounted within said slide receiving chamber having a pair of spaced arms which are rockable about a horizontal axis below said aperture and which carry a rearwardly biased wedging shoe, an ejector plate movable vertically through the rear of said slide receiving chamber from a point below said aperture to a point thereabove, linkage means interconnecting said injector plate, slide gate and ejector plate, and a power-driven timing shaft; means formed on said magazine supporting member for receiving the slides from said ejector plate and preventing their retrograde downward movement including a plurality of vertically spaced anchor shoes that are biased rearwardly toward the rear wall of said magazine supporting member whereby they will frictionally engage the front surfaces of said slides and urge them against said rear wall; guide means on the upper portion of said magazine means for directing the upwardly moving slides back into the upper end of said chamber; a pair of flat, horizontally extending stabilizing fingers pivotally mounted by the confronting walls of said magazine supporting member, the free end of each of said fingers being rotatable upwardly about a horizontal axis through said openings into the confines of said chamber; spring means normally biasing the free ends of said fingers to a position outside of the confines of said chamber; and, means interposed between said fingers and said timing shaft for pivoting the free end of said fingers into the confines of said chamber in timed relationship with the movement of said bottommost slide into a position to be exhibited whereby each slide dropping into the upper end of said chamber will be caused to assume a substantially horizontal position before resuming its fall therethrough.

10. Slide projector apparatus comprising: a frame formed with an aperture before which a slide may be disposed so as to be exhibited; a magazine supporting member carried by said frame and having a pair of vertically extending confronting walls; a magazine that is removably telescopically positionable within said magazine supporting member, said magazine having a pair of vertically extending confronting walls and being formed with a slide receiving chamber for holding a stack of slides; a pair of horizontally extending openings formed in the confronting walls of each of said magazine supporting member and said magazine, said openings being horizontally aligned when said magazine is disposed within said magazine supporting member; means on said frame for moving the bottommost slide from said stack into a position to be exhibited in front of said aperture and thence upwardly along the front surface of the rear wall of said magazine supporting member including an injector plate movable horizontally below said stack, a slide gate mounted within said slide receiving chamber having a pair of spaced arms which are rockable about a horizontal axis below said aperture and which carry a rearwardly biased wedging shoe, an ejector plate movable vertically through the rear of said slide receiving chamber from a point below said aperture to a point thereabove, linkage means interconnecting said injector plate, slide gate and ejector plate, and a power-driven timing shaft; means formed on said magazine supporting member for receiving the slides from said ejector plate and preventing their retrograde downward movement including a plurality of vertically spaced anchor shoes that are biased rearwardly toward the rear wall of said magazine supporting member whereby they will frictionally engage the front surfaces of said slides and urge them against said rear wall; guide means on the upper portion of said magazine means for directing the upwardly moving slides back into the upper end of said chamber; a pair of flat, horizontally extending stabilizing fingers; a pair of horizontally extending rods, each of said rods being rigidly affixed to one side of one of said stabilizing fingers; means pivotally connecting said rods to the confronting walls of said magazine supporting member whereby the free ends of said stabilizing fingers may rotate upwardly about a horizontal axis through said openings into the confines of said chamber; spring means normally biasing the free ends of said fingers to a position outside of the confines of said chamber; and, second linkage means interposed between said horizontal rods and said timing shaft for causing said rods to pivot said fingers into the confines of said chamber in timed relationship with the movement of the bottommost slide into a position to be exhibited whereby each slide dropping into the upper end of said chamber will be caused to assume a substantially horizontal position before resuming its fall therethrough.

11. Slide projector apparatus as set forth in claim 10 where said second linkage means includes a horizontal shaft mounted by the lower portion of said magazine supporting member normal to the rotational axis of said horizontal rods, a pair of crank arms keyed to said horizontal shaft, a pair of vertically extending links each connecting one of said horizontal rods with the free end of one of said crank arms whereby rotation of said horizontal shaft will effect concurrent rotation of said horizontal rods, and a stop keyed to said horizontal shaft, the free end of said stop normally abutting said magazine supporting member.

12. Slide projector apparatus as set forth in claim 11 where said frame supports a downwardly biased, vertically extending push rod having its lower end disposed in the path of a cam wheel keyed to said timing shaft, and said horizontal shaft is keyed to a crank arm element having its free end in removable engagement with the upper end of said push rod.

13. Slide projector apparatus, comprising: a frame formed with an aperture before which a slide may be disposed so as to be exhibited; magazine means carried by said frame and having a chamber holding a stack of slides to be exhibited, said magazine means including a pair of vertically extending confronting walls formed at their upper portion with a pair of horizontally extending aligned openings; injector means on said frame for urging the bottommost slide in said stack into a position to be exhibited in front of said aperture; ejector means on said frame for urging a slide upwardly away from said aperture after it has been exhibited; means on said magazine means for receiving the slides from said ejector and prevent their retrograde downward movement, the slides from said ejector ultimately dropping into the upper end of said chamber; a pair of flat, horizontally extending stabilizing fingers pivotally mounted by the confronting walls of said magazine means, the free end of each of said fingers being rotatable upwardly about a horizontal axis through one of said openings into the confines of said chamber; a timing shaft journaled by said frame and operatively connected to said injector and ejector means; a prime mover for rotating said timing shaft; linkage means interposed between said fingers and said timing shaft for pivoting said fingers into the confines of said chamber in timed relationship with the movement of said bottommost slide into a position to be exhibited whereby each slide dropping into the upper end of said chamber will be caused to assume a substantially horizontal position before resuming its fall therethrough, said linkage means including a wheel mounted by said frame with the rim of said wheel being formed with a notch; a spring-urged detent supported by said frame and engageable with said notch for restraining inadvertent rotation of said wheel; and, clutch means supported by said frame and interposed between said timing shaft and said wheel, said clutch means being intermittently actuated by connection with said timing shaft so as to releasably couple said shaft and said wheel.

14. Slide projector apparatus comprising: a frame formed with an aperture before which a slide may be disposed so as to be exhibited; a magazine supporting member carried by said frame and having a pair of vertically extending confronting walls; a magazine that is removably telescopically positionable within said magazine supporting member, said magazine having a pair of vertically extending confronting walls and being formed with a slide receiving chamber for holding a stack of slides; a pair of horizontally extending openings formed in the confronting walls of each of said magazine supporting member and said magazine, said openings being horizontally aligned when said magazine is disposed within said magazine supporting member; injector means on said frame for urging the bottommost slide in said stack into a position to be exhibited in front of said aperture; ejector means on said frame for urging the slide upwardly away from said aperture after it has been exhibited; means on said magazine supporting member for receiving the slides from said ejector and preventing their retrograde downward movement, the slides from said ejector ultimately dropping into the upper end of said chamber; a pair of flat, horizontally extending stabilizing fingers; a pair of horizontally extending rods, each of said rods being rigidly affixed to one edge of one of said stabilizing fingers; means pivotally connecting said rods to the confronting walls of said magazine supporting member whereby the free ends of said stabilizing fingers may rotate upwardly about a horizontal axis through said openings into the confines of said chamber; spring means normally biasing the free end of said fingers to a position outside of the confines of said chamber; a timing shaft journaled by said frame and operatively connected to said injector and ejector means; a prime mover for rotating said timing shaft; linkage means interposed between said horizontal rods and said timing shaft for causing said rods to pivot said fingers into the confines of said chamber in timed relationship with movement of the bottommost slide into a position to be exhibited whereby each slide dropping into the upper end of said chamber will be caused to assume a susbtantially horizontal position before resuming its fall therethrough, said linkage means including a wheel mounted by said frame with the rim of said wheel being formed with a notch; a spring-urged detent supported by said frame and engageable with said notch for restraining inadvertent rotation of said wheel; and, clutch means supported by said frame and interposed between said timing shaft and said wheel, said clutch means being intermittently actuated by connection with said timing shaft so as to releasably couple said timing shaft and said wheel.

15. Slide projector apparatus as set forth in claim 14 where said linkage means further includes a horizontal shaft mounted by the lower portion of said magazine supporting member normal to the rotational axis of said horizontal rods, a pair of crank arms keyed to said horizontal shaft, a pair of vertically extending links each connecting one of said horizontal rods with the free end of one of said crank arms whereby rotation of said horizontal shaft will effect concurrent rotation of said horizontal rods, and a stop keyed to said horizontal shaft, the free end of said stop normally abutting the free end of said magazine supporting member.

16. Slide projector apparatus as set forth in claim 15 where said frame supports a downwardly biased, vertically extending push rod having its lower end disposed in the path of a cam wheel keyed to said timing shaft, and said horizontal shaft is keyed to a crank arm element having its free end in removable engagement with the upper end of said push rod.

References Cited in the file of this patent
UNITED STATES PATENTS

| | | |
|---|---|---|
| 2,255,719 | Warriner | Sept. 9, 1941 |
| 2,593,007 | Cadwell et al. | Apr. 15, 1952 |
| 2,671,378 | Burla | Mar. 9, 1954 |